United States Patent [19]
Ashburn et al.

[11] Patent Number: 5,823,906
[45] Date of Patent: Oct. 20, 1998

[54] NUTATION MOTION GENERATOR

[75] Inventors: James D. Ashburn, Atlanta, Ga.; Steven W. Peterson; Alvin M. Strauss, both of Nashville, Tenn.

[73] Assignee: Vanderbilt University, Nashville, Tenn.

[21] Appl. No.: 778,293

[22] Filed: Jan. 2, 1997

[51] Int. Cl.[6] .................................................. F16H 23/08
[52] U.S. Cl. ...................... 475/164; 74/129; 74/490.06; 475/163
[58] Field of Search .............................. 74/60, 126, 129, 74/490.06; 475/163, 164

[56] References Cited

U.S. PATENT DOCUMENTS

| | | | |
|---|---|---|---|
| Re. 22,549 | 9/1944 | Plensler ................................ | 475/163 X |
| 2,149,321 | 3/1939 | Taylor et al. . | |
| 2,550,612 | 4/1951 | Sparman . | |
| 3,359,810 | 12/1967 | Hansen . | |
| 3,661,036 | 5/1972 | Quiram et al. ........................... | 475/163 |
| 4,280,359 | 7/1981 | Schmid et al. . | |
| 4,330,725 | 5/1982 | Hintz . | |
| 4,537,264 | 8/1985 | Schmid et al. . | |
| 4,550,630 | 11/1985 | Remus . | |
| 4,563,915 | 1/1986 | Tibbals, Jr. . | |
| 4,612,999 | 9/1986 | Bergler . | |
| 4,651,589 | 3/1987 | Lambert ..................................... | 74/469 |
| 4,765,194 | 8/1988 | Van Meegen . | |
| 4,806,068 | 2/1989 | Kohli et al. ....................... | 74/479.01 X |
| 4,848,179 | 7/1989 | Ubhayakar ........................... | 74/490.04 |
| 4,976,582 | 12/1990 | Clavel .............................. | 74/479.01 X |
| 5,048,356 | 9/1991 | Levko . | |
| 5,228,379 | 7/1993 | Kawai et al. . | |
| 5,699,695 | 12/1997 | Canfield et al. ...................... | 74/490.06 |

*Primary Examiner*—Allan D. Herrmann
*Attorney, Agent, or Firm*—Waddey & Patterson; I. C. Waddey, Jr.

[57] ABSTRACT

A nutation motion generator which transforms linear motion into nutation motion. The device employs a spherical, four-bar linkage mechanism. Three four-bar linkage mechanisms are sandwiched between a stationary support surface and a drive plate and arranged at 120° intervals about the support surface. Each four-bar linkage mechanism is constructed of four planar sections which are hinged along their edges, the four hinged planar sections being essentially triangular in shape so that they would join at a point in the center of the device if they extended to the apex of their respective triangles. A universal joint is located at the center of the device to provide stability. The four-bar linkage mechanism can be collapsed to a substantially flatten configuration, opened and then collapsed to a substantially flattened configuration at an angle 90° to that of the first flattened configuration. Since each four-bar linkage mechanism has this capacity, the drive plate can be positioned at any angle relative to the support surface. The movement of the four-bar linkage mechanisms is generated by an actuator consisting of three reciprocal-motion drivers connected between the hinged edges of adjacent four-bar linkage mechanisms which are driven by a controlled electric pulse. The reciprocal-motion drivers, for micro applications, are piezo-ceramic stacks. If the drive plate is circular and its outer perimeter is fitted with beveled gear teeth, a second gear (the "driven" gear), with a smaller diameter than the drive gear, can be meshed with the drive gear to drive the driven gear at a reduced speed and at a relatively high torque. The three-dimensional motion of the mechanism makes the device very compact, and amplification is improved as the device is made flatter. In addition, the interaction between the nutating element and the top of the support surface creates a very large gear reduction.

18 Claims, 4 Drawing Sheets

NUTATION MOTION GENERATOR

BACKGROUND OF THE INVENTION

The present invention relates generally to a mechanical power conversion device and more particularly to a device for the generation of nutation motion. The device converts linear motion into nutating motion and can create large rotation angles from small linear displacements.

It will be appreciated by those skilled in the art that the theory of nutation motion has been applied in a variety of speed reduction and torque multiplication applications. One such application is the use of nutating gears in a cordless screw driver to reduce the speed and increase the torque of the device as is described and illustrated in the Jan. 19, 1992 issue of *Mechanical Engineering, Nutating Gear Drive Train for a Cordless Screwdriver*, by David K. Kendroski and Scott P. Slimak. A copy of that article is attached to this application and incorporated herein by reference for purposes of background and to provide information useful in satisfying the enabling disclosure requirements with respect to the present invention.

A primary difficulty with prior art drive trains employing the nutation motion theory is one of size and control. More specifically, prior art devices which have employed the nutation motion theory are generally large and cumbersome. Most frequently, they are gear driven on the power input side and while some devices convert a reciprocal movement to a higher torque, lower speed rotating power output, such devices are generally bulky and cannot be adapted for precise control. Further, such devices, in practically every instance, require parts and structure of a size that eliminates them as options for applications involving confined spaces.

Use of the nutation motion concept for precise control in micro applications would be highly desirable if a workable design were available. Adaptive optics is one such application. For example, the angle of the wobble plate could be used as a method of controlling the angle of laser surgery devices or controlling infra-red light beam alignment. With additional assemblies, the device can be used for controlling infusion pumps, dental equipment and a variety of applications requiring angular position control.

Thus, while nutation motion generator devices exist and generally are used to reduce speed and increase torque on the output side of the device, the adaptation of such devices to control, through minute adjustments, the angle of the wobble plate has not been explored because of the absence of a refined mechanism to effect such control. Further, even if such control was possible, the size of the prior art devices precludes their use in many of these applications. Our invention overcomes these deficiencies of the prior art.

SUMMARY OF THE INVENTION

We have developed a nutation motion generator which transforms linear motion into nutation motion. The device employs a spherical, four-bar linkage mechanism. In the preferred embodiment, there are three four-bar linkage mechanisms sandwiched between a stationary support surface and a drive plate. There must be a minimum of three linkage mechanisms, but more than three can be used with appropriate control signals. The invention will be described as using the three linkage mechanisms, which is the preferred configuration due to simplicity. In this configuration, the three four-bar linkage elements are arranged at 120° intervals about the support surface. The drive plate faces the support surface and is connected to opposing sides of the four-bar linkage mechanisms.

Each four-bar linkage mechanism is constructed of four planar sections which are hinged along their edges, the four hinged planar sections being essentially triangular in shape so that they would join at a point in the center of the device if they extended to the apex of their respective triangles. Thus, all rotation axes intersect at a common point. A portion of the apex of each of the planar sections has been removed to provide working space at the center of the system for the hinges that connect the edges of the planar sections. Further, a universal joint is located at the center of the device to provide stability. By this construction, each of the four-bar linkage mechanism can be collapsed to a substantially flatten configuration, opened and then collapsed to a substantially flattened configuration at an angle 90° to that of the first flattened configuration. This linkage allows the point of connection between the four-bar linkage mechanism and the drive plate to actually move in a controlled reciprocal movement. Since each four-bar linkage mechanism has this capacity, the drive plate can be positioned at a continuous range of angles relative to the support surface.

The movement of the four-bar linkage mechanisms is generated by an actuator consisting of three reciprocal-motion drivers connected between the hinged edges of adjacent four-bar linkage mechanisms which are driven by a given control signal. The reciprocal-motion drivers, for micro applications, are preferably piezoceramic stacks. The piezoceramic stacks expand and contract in response to electrical impulses and thus move in a minute, piston-like or reciprocal motion. The device has two degrees of freedom. Thus, expansion of one driver will force contraction of one or both of the other drivers. When the three drivers are spaced 120° apart and are driven by a three phase power source, the drive plate will be forced into a nutation motion by which the angle of the axis of the drive plate can be precisely controlled.

If the application calls for transmission of a driving torque or precise positioning about a rotation axis, rather than controlling the angle of the drive plate, the configuration of the device should have a circular drive plate with frictional pad or gear teeth on its outer perimeter. The device is then fitted with a second plate (the "driven" plate), having a mating friction pad or gear of a smaller diameter than the diameter of the drive plate. This configuration allows the drive plate to drive the driven plate at a reduced speed transmitting a relatively high torque. Our device is thus able to amplify the small motion of the piezoceramic stacks into motions particularly useful for driving small devices. The three-dimensional motion of the mechanism makes the device very compact, and amplification is improved as the device is made flatter. In addition, the interaction between the nutating element and the top of the support surface creates a very large gear reduction. This gear reduction is an advantage because piezoceramic actuators are most efficient when performing at very fast oscillation frequencies (in the KHz range). The gear reduction provides an output rotational speed which is much slower and more useful in applications such as, for example, auto-focus camera lens. Our device can also be used to replace stepper motors and similar drivers in applications requiring positioning accuracy, such as positioning samples in electron microscopy or X-ray defraction equipment.

DESCRIPTION OF THE PREFERRED EMBODIMENT

Figure 1:
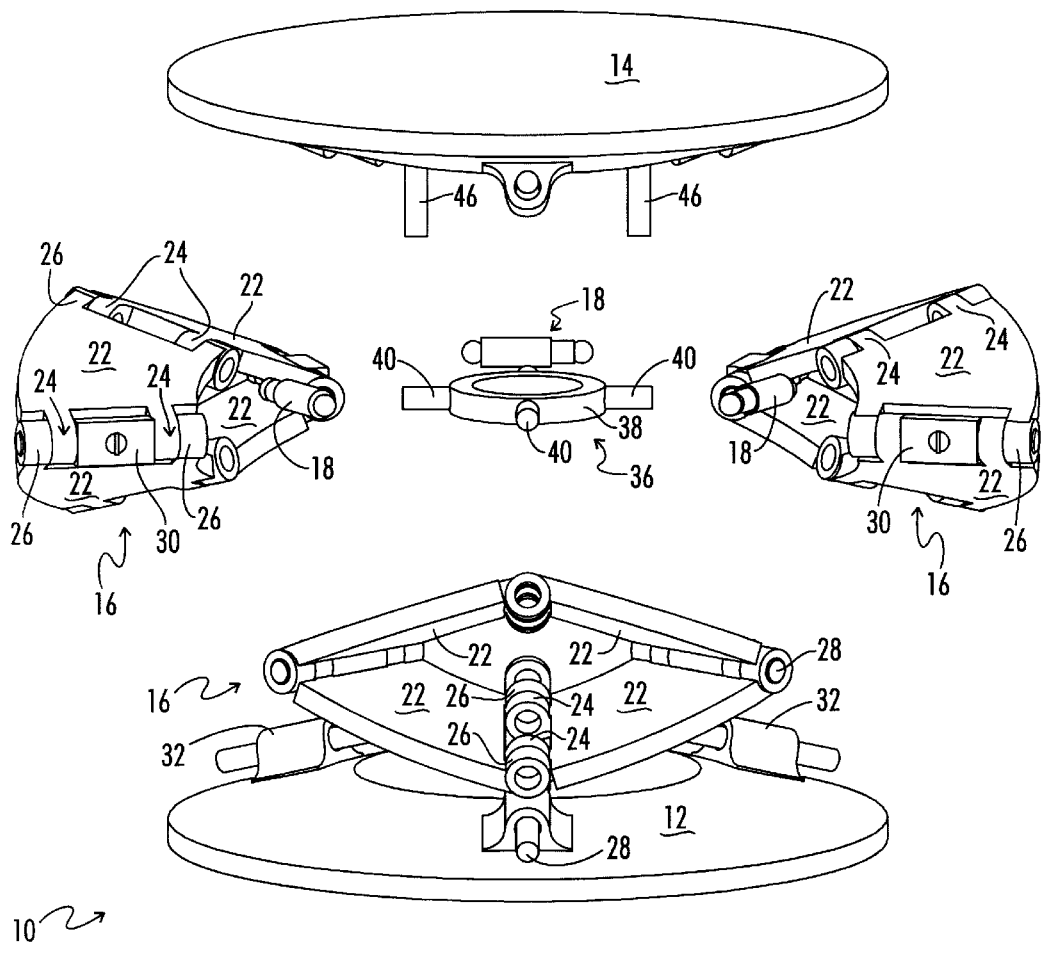
FIG. 1 is an exploded perspective view of the invention.

Applicants' invention will be best understood when consideration is given to the accompanying drawings which illustrate a preferred embodiment of the invention and wherein like reference numerals refer to like parts.

Figure 2:
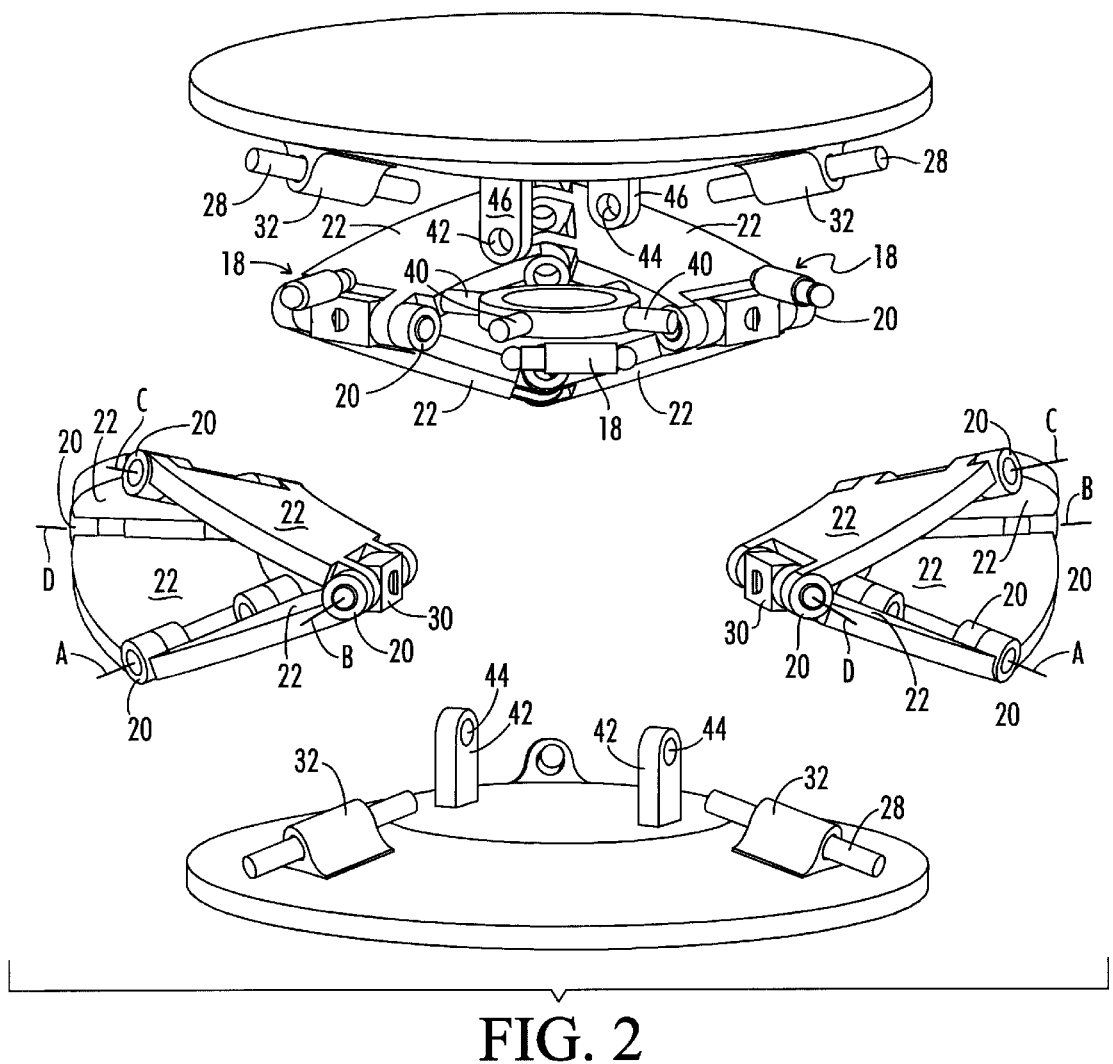
FIG. 2 is a view similar to the view of FIG. 1, except viewed from a slightly different angle.

Referring to FIGS. 1 and 2 which illustrate the invention in exploded perspective view, there is shown generally at 10 Applicants' nutation motion generator. The nutation motion generator 10 includes a base having a support surface 12. The base as shown in FIGS. 1 and 2 is a circular, thin cone which would generally be anchored to a portion of a device in which the nutation motion generator of the present invention is installed. The support surface 12 is circular and lying in a plane sitting horizontally for purposes of this description, although the surface clearly does not have to be circular and can be oriented in any desired direction.

Facing the support surface 12 is a drive plate 14. By virtue of the linkage mechanisms as hereinafter described, a wobble motion can be created in the drive plate 14, and the face of the drive plate 14 can thus be oriented in an infinite number of positions relative to the support surface 12. The connection between the support surface and the drive plate is via the four-bar linkage mechanisms 16. In the preferred embodiment, there are three of the four bar linkage mechanisms 16 which are spaced equally around the base, lying in a plane that is perpendicular to the axis of the support surface 12.

Each four bar linkage mechanism is identical, and each includes four planar sections 22, each planar section being generally in the shape of a piece of pie with the cusp removed. In one preferred embodiment, the planar section 22 includes side edges 19, a front edge 23, and a back edge 25. The front 23 and back 25 edges are substantially parallel. The opposing side edges 19 typically converge, going from back to front, where front is toward the center of the device. Typically, the sides of one planar section 22 are flexibly connected to adjacent sides 19 of adjacent planar sections 22. The linkage mechanisms 16 are connected to the support surface 12, to the drive plate 14, and indirectly, to each other 22 so that all rotation axes intersect at a common point. The four planar sections are connected together by hinges 20 along their side edges 19. Thus, adjacent sides of a generally trapezoidal, planar section are flexibly connected. The hinges 20 as shown in the preferred embodiment illustrated in FIGS. 1 and 2 include inside sleeves 24 and outside sleeves 26, integral with the planar sections 22, with a dowel 28 passing through the sleeves to connect adjacent edges of the planar sections 22. The hinges used to connect the planar sections for micro applications will more often be a material that flexes about a hinge line, thereby obviating the bulkier mechanical hinges used for illustrative purposes in this description; but any one of many known hinge structures could be used to connect the adjacent planar sections.

For each four bar linkage mechanism, there are four hinge lines A, B, C and D (or first, second, third, and fourth hinge lines). In each case, hinge line A (connecting two adjacent side edges 19) is connected to the support surface 12 by the cooperation of a journal 32 which fits inside the inner sleeves 24 and has a opening therethrough to receive the dowel 28. Thus, the four bar linkage mechanism flexes along the hinge line A about its point of connection to its support surface 12. Hinge line C (also connecting two adjacent side edges 19) is connected in a similar fashion through the cooperation of the journal 32 on the underside of the drive plate 14 with the dowel 28 passing through the journal 32 and connecting the hinge line C of the four bar linkage mechanism to the drive plate 14. The support surface 12 and the underside of the drive plate 14 will be gently conical in order to accommodate the movement of the linkage mechanism as is described herein.

The hinge line B has a linkage mechanism 30 with a hole passing through it to receive the dowel 28 when the linkage mechanism 30 is fitted inside the inside sleeves 24. A similar linkage mechanism 30 is assembled into the hinge line D, and the drivers 18 are connected at one end to the linkage mechanism 30 at hinge line B with adjacent mechanism 30 in hinge line D of the adjacent four bar linkage mechanisms.

Located centrally within the mechanism is a universal joint 36 which includes a collar 38 and studs 40. Projecting upwardly from support surface 12 are control arms 42 with holes 44 passing through their free ends. Likewise, projecting downwardly from the underside of the drive plate 14 are control arms 46 with holes 44 through their free end. The control arms 42 receive opposing studs 40 projecting from diametrically opposite sides of the universal joint 38 while the control arms 46 receive the other two studs 40 of the universal joint, thus allowing universal movement of the device while providing stability to it.

Figure 4:
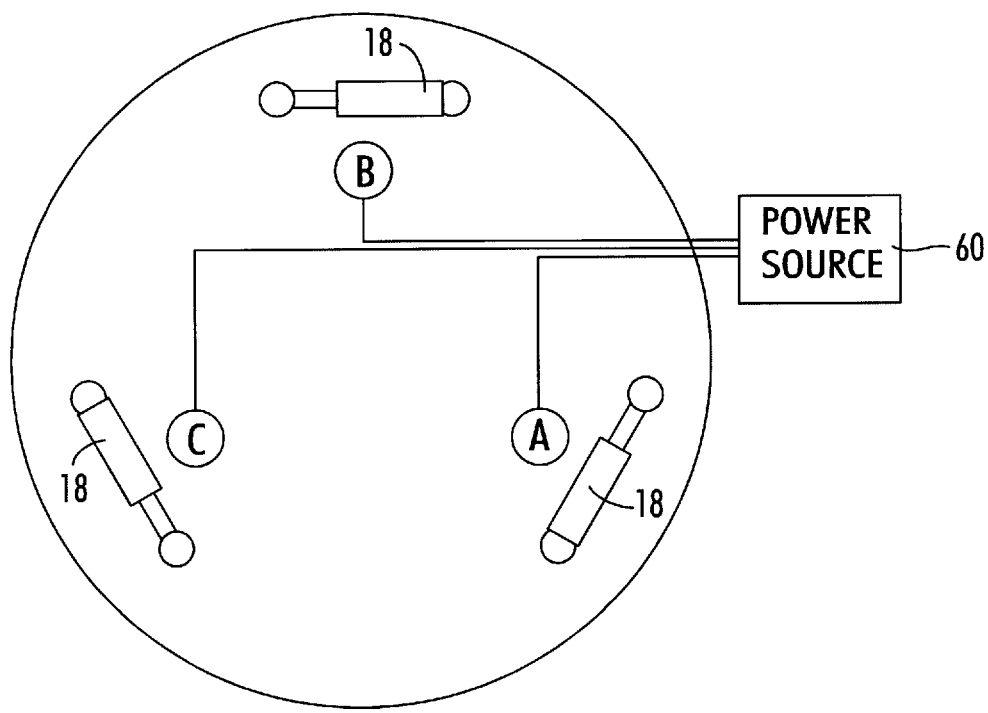
FIG. 4 is a schematic view of the three actuators connected to the power source.
Figure 5:
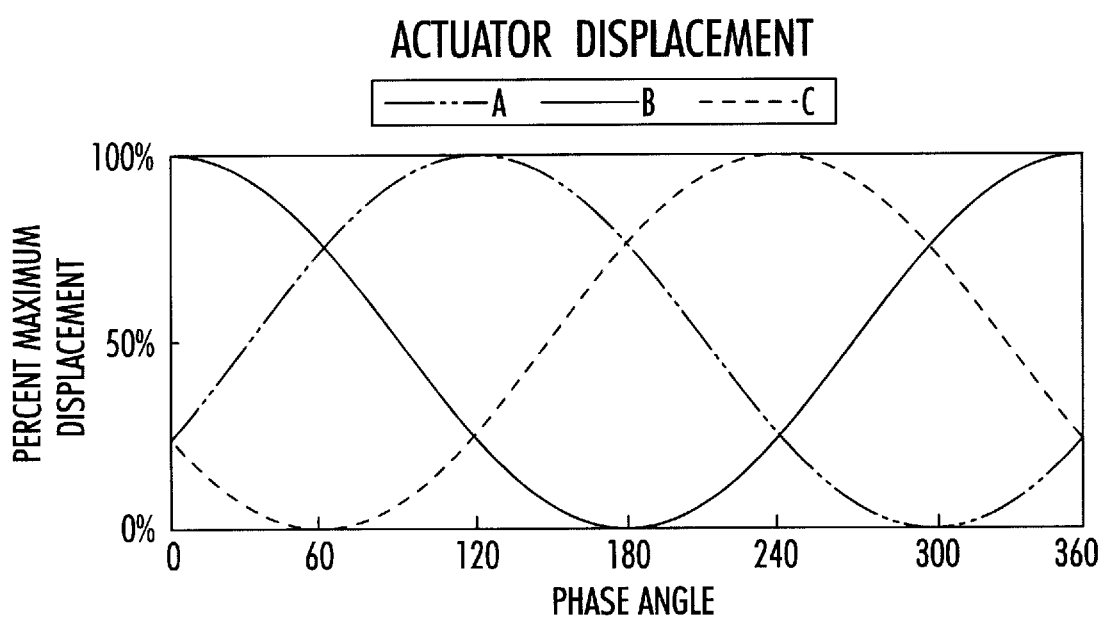
FIG. 5 is a chart showing the actuator displacement of the three separate actuators as they are driven by the controlled, three-phase power source which provides energy to the driver mechanism.

In operation, each of the three drivers 18 are connected to a controlled, three-phase power source which provides energy to the driver mechanism. The energy source is preferably a continuous sinusoidal, three phase signal. Each phase of the signal is used to drive a separate drive 18. The energy activates the driver elements in series. As one element is activated, it expands, causing the next element to contract slightly and the third element is contracting completely. As the power source output continues, the second element expands completely while the third element expands partially and the first element contracts totally. FIG. 4 illustrates generally the connection of the three drivers 18 to the power source 60 and FIG. 5 illustrates the actuator displacement in response to the controlled, three-phase power source which provides energy to the driver mechanism. This continuous signal from the power source to the drivers converts the linear or reciprocal motion of the piezoceramic elements into a nutating motion of the drive plate. The magnitude of the sinusoidal signal can also be used to control the angle of the nutation motion.

Alternate configurations of the drive system could employ an energy reservoir, such as is a spring, in place of one of the drivers (in the configuration using three drivers). Further, if one of the three points of connection between the drive plate and the driven plate is fixed, the device can be used to generate an arcuate, oscillating motion in the driven plate.

Figure 3:
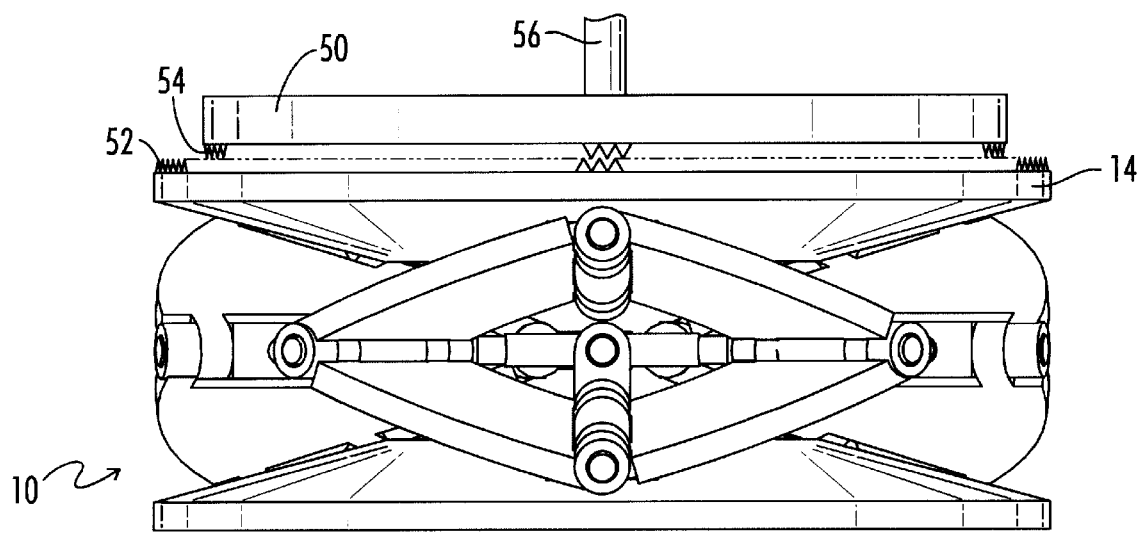
FIG. 3a is a frontal view of a modification of the device with a driven gear having teeth meshing with teeth on the drive gear.
FIG. 3b is a frontal view of a device substantially similar to the device shown in FIG. 3a, however, friction pads are used rather than gear teeth.
Figure 3A:
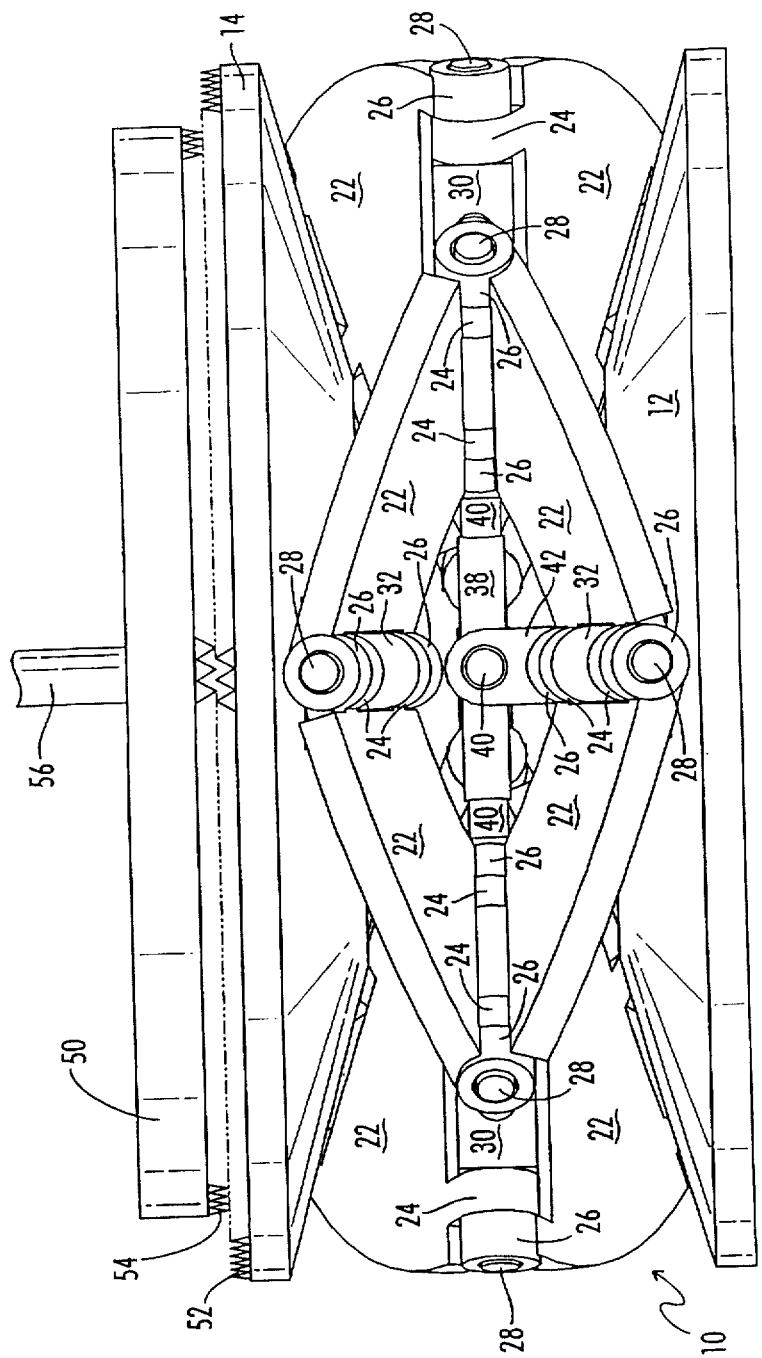

FIG. 3a illustrates the device modified for gear reduction applications. Facing the drive plate 14 is a driven plate 50. The outer perimeter of the drive plate carries teeth 52 which mesh with teeth 54 carried about the outer perimeter of the driven plate. The teeth mesh at the point where the perimeter of the drive plate is at its maximum distance from the support surface 12. This point moves in a circle by virtue of the nutation motion of the drive plate/gear. Because of the nutation motion of the drive gear, the point scribes a circle having a diameter less than the diameter of the drive plate, necessitating that the driven gear, which remains in a single plane, have a diameter equal to the diameter of the circle scribed by the point, rather than the diameter of the drive plate. This structure permits the device to convert the linear, piston-like action of the drivers 18 to a low-speed, high torque rotational output. The control and precision with which the device can operate makes it particularly adaptable to micro applications.

Figure 3B:
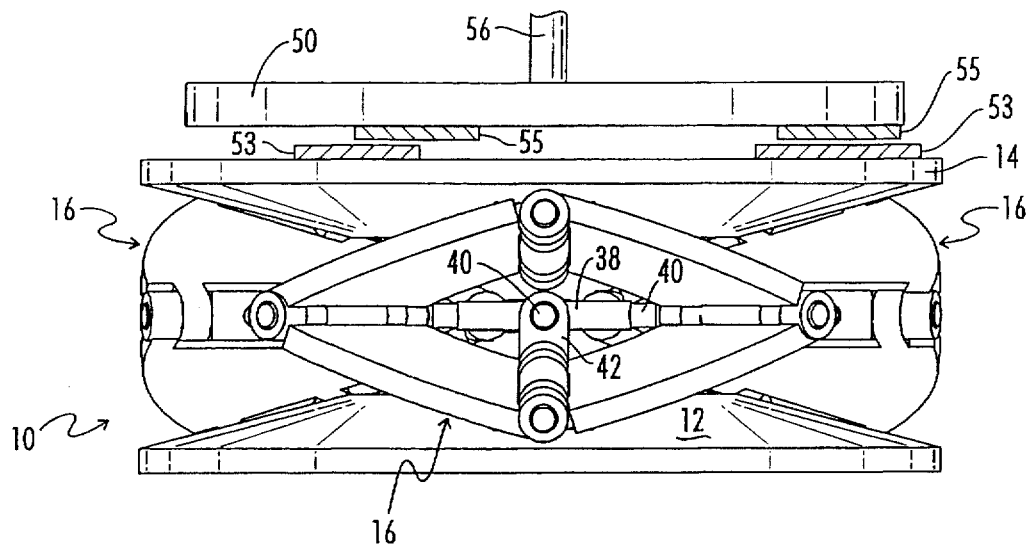
Figure 4:
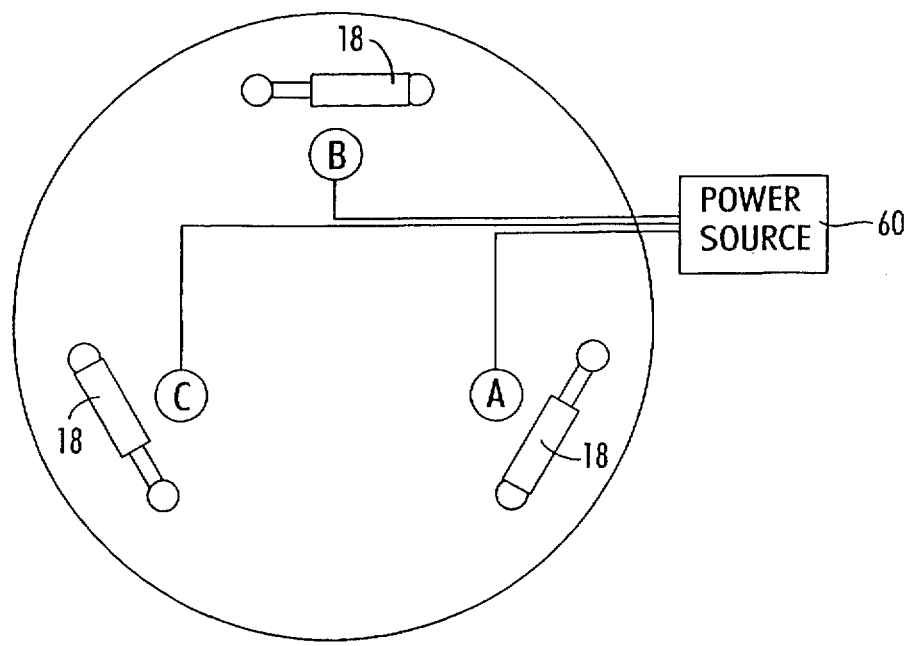
Figure 5:
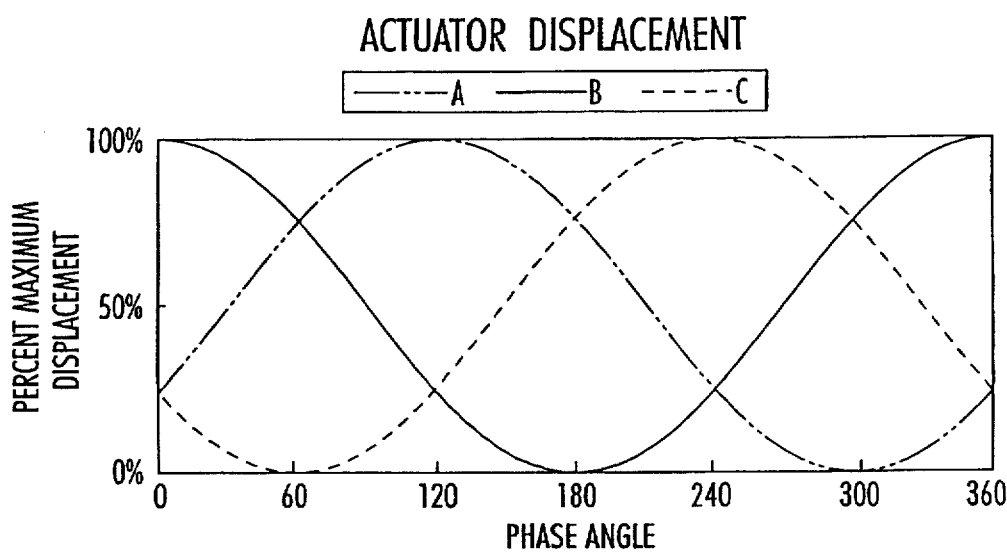

FIG. 3b shows a device 10 substantially similar to the one shown in FIG. 3a. FIG. 3b shows use of friction pads 53 attached to the drive plate, and friction pad 55 attached to the driven plate. The friction pads are adapted to cooperate through any conventional manner. FIG. 3b also includes support surface 12 supporting linkage mechanisms 16, and a drive plate 14 connected to the linkage mechanisms 16.

Figure 6:
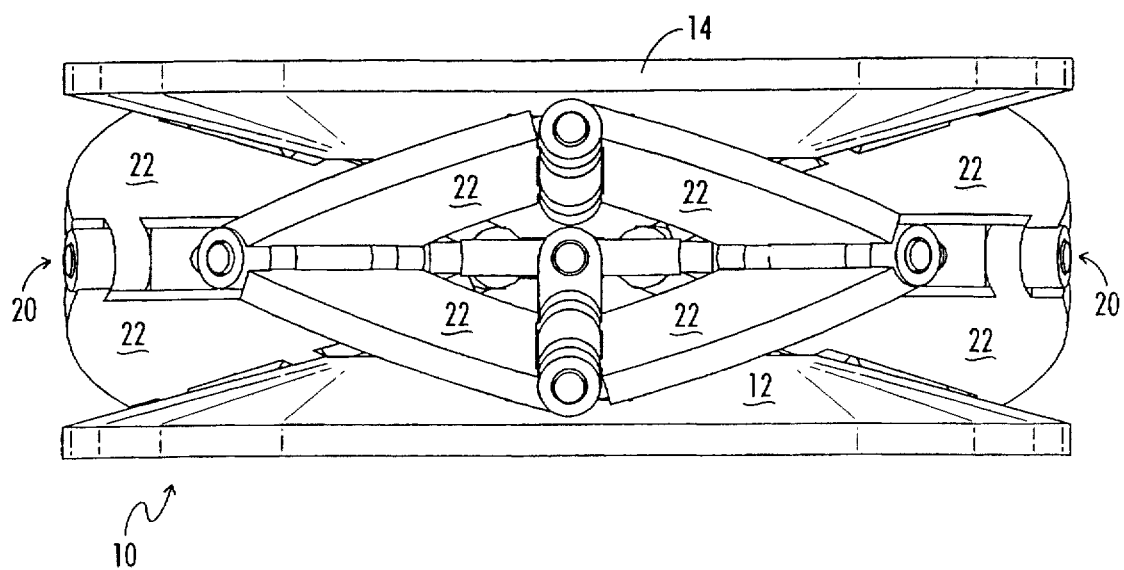
FIG. 6 is a frontal view of the assembled device.

FIG. 6 show a frontal view of a nutation motion generator 10. Excessive annotation has been excluded from FIGS. 3b and 6 for clarity. Reference can be had to other drawings for numerical annotations and identification.

Figure 7:
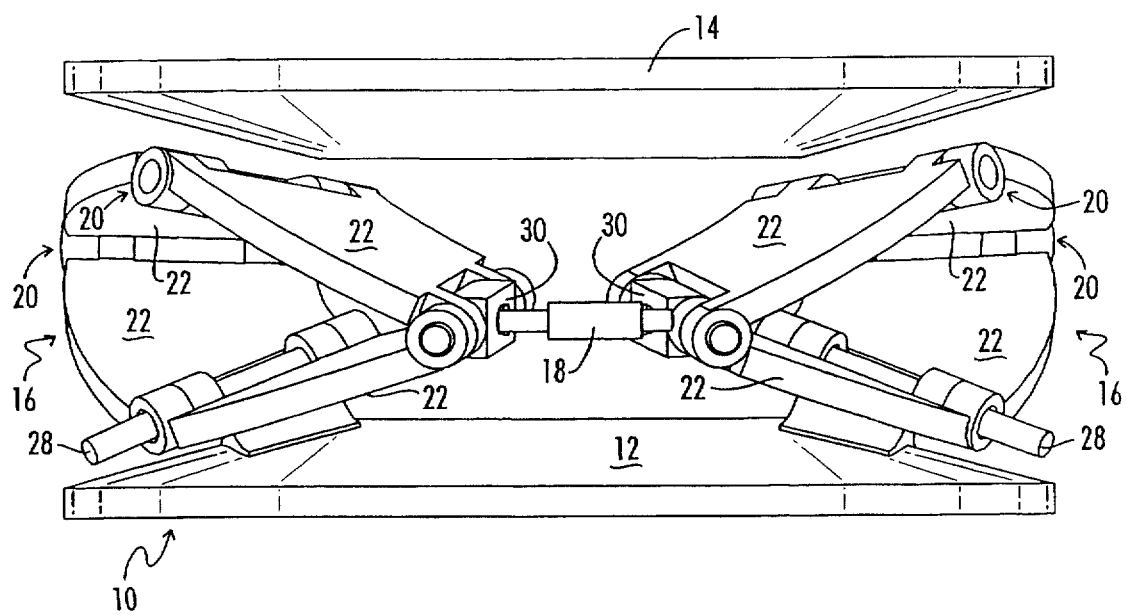
FIG. 7 is a view of the device from an angle different from the view shown in FIG. 6. The universal joint, the third four-bar linkage, and upper journal supports have been removed for clarity.

FIG. 7 shows a view of a nutation motion generator 10 from an angle different than the one shown in FIG. 6. FIG. 7 shows a reciprocal motion driver 18 connecting two four-bar linkage mechanisms 16. The reciprocal motion drive 18 is connected to linkage mechanisms 30 along the hinge lines. The upper journal supports, the central mechanisms and the far four-bar linkage mechanism have been excluded from the drawing for clarity.

Although there have been described particular embodiments of the present invention of a new and useful Nutation Motion Generator it is not intended that such be construed as limitations upon the scope of this invention except as set forth in the following claims.

What I claim is:

1. A nutation motion generator device for transforming linear motion into nutating motion comprising:
    a. a support surface;
    b. a drive plate spaced from said support surface;
    c. three linkage mechanisms connecting said drive plate to said support surface to create a plurality of rotation axes such that all rotation axes intersect at a common point;
    d. a driver mechanism including three reciprocal motion drivers, the three reciprocal motion drivers in operable connection with the three linkage mechanisms; and
    e. a three-phase power source for providing energy to the driver mechanism, the power source in operable connection with the driver mechanism.

2. The device of claim 1 wherein the three linkage mechanisms are arranged at 120° intervals about said support surface.

3. The device of claim 1 wherein each of the three linkage mechanisms further comprises a four-bar linkage mechanism, the four-bar linkage mechanism including four planar sections, each planar section substantially triangular in shape and having opposing edges, wherein said opposing edges are hingedly connected.

4. The device of claim 1 wherein each of the three linkage mechanisms further comprises a four-bar linkage mechanism, the four-bar linkage mechanism including four planar sections, each planar section adjacent to another and being substantially trapezoidal in shape with substantially parallel front and back edges and converging opposing side edges; the side edges of each planar section flexibly connected to the adjacent planar sections whereby an extension of the connected side edges would converge at a common point.

5. The device of claim 4 wherein each four-bar linkage mechanism further comprises a first, a second, a third, and a fourth hinge line between adjacent side edges, each hinge line including a hinge; and wherein the first hinge line is connected to said support surface and the third hinge line is connected to said drive plate.

6. The device of claim 5 wherein the second hinge line of each four-bar linkage mechanism is connected to one of the three reciprocal motion drivers; and wherein the fourth hinge line of each four-bar linkage mechanism is connect to another of the three reciprocal motion drivers.

7. The device of claim 1 wherein said reciprocal motion drivers are piazzo ceramic stacks.

8. The device of claim 1 wherein said drive plate is circular.

9. The device of claim 1 wherein one each of the reciprocal motion drivers is positioned between and connecting adjacent linkage mechanisms.

10. The device of claim 1 further comprising a universal joint located in the center of the device, the universal joint in operable connection with the support surface.

11. A nutation motion generator for transforming linear motion into nutating motion including:
    a. a support surface;
    b. a drive plate spaced from said support surface, wherein said drive plate has gear teeth in a circular array;
    c. three linkage mechanisms connecting said drive plate to said support surface;
    d. said linkage mechanism each movable between a collapsed position and an extended position;
    e. a drive mechanism including three reciprocal motion drivers, one each positioned between and connecting adjacent linkage mechanism; and
    f. a three-phase power source for providing energy to the driver mechanism.

12. The device of claim 11 further including a driven plate having gear teeth in a circular array, said gear teeth on said driven plate in operable communication with the gear teeth of said drive plate when said drive plate is spaced an operable distance from the support surface such that the gear teeth on the drive plate communicate with the gear teeth on the driven plate.

13. The device of claim 12 wherein the diameter of the circular gear teeth on the driven plate is less than the diameter of the circular gear teeth on the drive plate.

14. A nutation motion generator for transforming linear motion into nutating motion including:
    a. a support surface;
    b. a drive plate spaced from said support surface, wherein said drive plate has a friction pad thereon;
    c. three linkage mechanisms connecting said drive plate to said support surface;
    d. said linkage mechanism each movable between a collapsed position and an extended position;

e. a drive mechanism including three reciprocal motion drivers, one each positioned between and connecting adjacent linkage mechanism; and f. a three-phase power source for providing energy to the driver mechanism.

15. A nutation motion generator for transforming linear motion into nutating motion including:

a. a support surface;

b. a drive Plate spaced from said support surface, wherein said drive plate has a friction pad thereon;

c. three linkage mechanisms connecting said drive plate to said support surface;

d. said linkage mechanism each movable between a collapsed position and an extended position;

e. a drive mechanism including three reciprocal motion drivers, one each positioned between and connecting adjacent linkage mechanism;

f. a three-phase power source for providing energy to the driver mechanism; and g. a driven plate, where said driven plate carries a mating friction pad.

16. The device of claim 15 wherein said friction pads are in a circular pattern.

17. The device of claim 16 wherein the circular pattern of the friction pad of the driven plate is of a less diameter than that of friction pad of the drive plate.

18. A nutation motion generating device for transforming linear motion into nutating motion including:

a. a support surface;

b. a drive plate spaced from said support surface;

c. three linkage mechanisms connecting said drive plate to said support surface;

d. said linkage mechanism each movable between a collapsed position and an extended position;

e. a drive mechanism including three reciprocal motion drivers, one each positioned between and connecting adjacent linkage mechanism;

f. a three-phase power source for providing energy to the driver mechanism; and g. a universal joint located in the center of the device.

* * * * *

UNITED STATES PATENT AND TRADEMARK OFFICE
CERTIFICATE OF CORRECTION

PATENT NO. : 5,823,906
DATED : October 20, 1998
INVENTOR(S) : Ashburn, et al

It is certified that error appears in the above-identified patent and that said Letters Patent is hereby corrected as shown below:

The Drawing Sheet, consisting of Fig. 3, should be deleted to be replaced with the Drawing Sheets, consisting on Fig. 3a, as shown on the attached page.

The Drawing Sheets, consisting of Figs. 3b, 6, and 7, should be added as shown on the attached page.

Signed and Sealed this

Twelfth Day of October, 1999

Q. TODD DICKINSON

*Attest:*

*Attesting Officer*          *Acting Commissioner of Patents and Trademarks*